(12) United States Patent
David et al.

(10) Patent No.: US 8,412,479 B2
(45) Date of Patent: Apr. 2, 2013

(54) MEMORY POWER ESTIMATION BY MEANS OF CALIBRATED WEIGHTS AND ACTIVITY COUNTERS

(75) Inventors: Howard S. David, Portland, OR (US); Eugene Gorbatov, Hillsboro, OR (US); Ulf R. Hanebutte, Gig Harbor, WA (US); Minh Le, North Plains, OR (US); Rahul Khanna, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 12/826,039

(22) Filed: Jun. 29, 2010

(65) Prior Publication Data

US 2011/0320150 A1   Dec. 29, 2011

(51) Int. Cl.
*G06F 19/00*   (2011.01)
(52) U.S. Cl. .......... 702/85; 702/107; 702/126; 702/189; 323/281; 323/293; 323/303; 363/95; 363/97; 365/227
(58) Field of Classification Search ............ 702/85, 702/107, 126, 189; 323/281, 293, 303; 363/95, 363/97; 365/227
See application file for complete search history.

(56) References Cited

U.S. PATENT DOCUMENTS

| | | | | |
|---|---|---|---|---|
| 5,671,025 A * | 9/1997 | Ryu | | 348/745 |
| 5,860,106 A * | 1/1999 | Domen et al. | | 713/324 |
| 6,549,867 B1 * | 4/2003 | Smith | | 702/107 |
| 7,882,369 B1 * | 2/2011 | Kelleher et al. | | 713/300 |
| 7,944,764 B1 * | 5/2011 | Qawami et al. | | 365/200 |
| 7,996,726 B2 * | 8/2011 | Ito | | 714/42 |
| 8,041,521 B2 * | 10/2011 | Bletsch et al. | | 702/60 |
| 2002/0069382 A1 * | 6/2002 | Hayashi et al. | | 714/715 |
| 2005/0152212 A1 * | 7/2005 | Yang et al. | | 365/233 |
| 2006/0090086 A1 | 4/2006 | Rotem et al. | | |
| 2009/0138219 A1 * | 5/2009 | Bletsch et al. | | 702/60 |
| 2009/0217111 A1 * | 8/2009 | Ito | | 714/718 |
| 2009/0228902 A1 * | 9/2009 | Hacking | | 719/318 |
| 2010/0268974 A1 * | 10/2010 | Floyd et al. | | 713/340 |
| 2011/0131399 A1 * | 6/2011 | Sainath | | 713/2 |

FOREIGN PATENT DOCUMENTS

| | | |
|---|---|---|
| WO | 2012/006112 A2 | 1/2012 |
| WO | 2012/006112 A3 | 4/2012 |

OTHER PUBLICATIONS

International Search Report and Written Opinion received for PCT Patent Application No. PCT/US2011/042234, mailed on Feb. 9, 2012, 9 Pages.

* cited by examiner

*Primary Examiner* — Carol Tsai
(74) *Attorney, Agent, or Firm* — Blakely, Sokoloff, Taylor & Zafman LLP

(57) ABSTRACT

Memory power estimation by means of calibrated weights and activity counters are generally presented. In this regard, in one embodiment, a memory power is introduced to read a value from a memory activity counter, to determine a memory power estimation based at least in part on the value and a calibration, and to store the memory power estimation to a register. Other embodiments are also described and claimed.

10 Claims, 4 Drawing Sheets

106

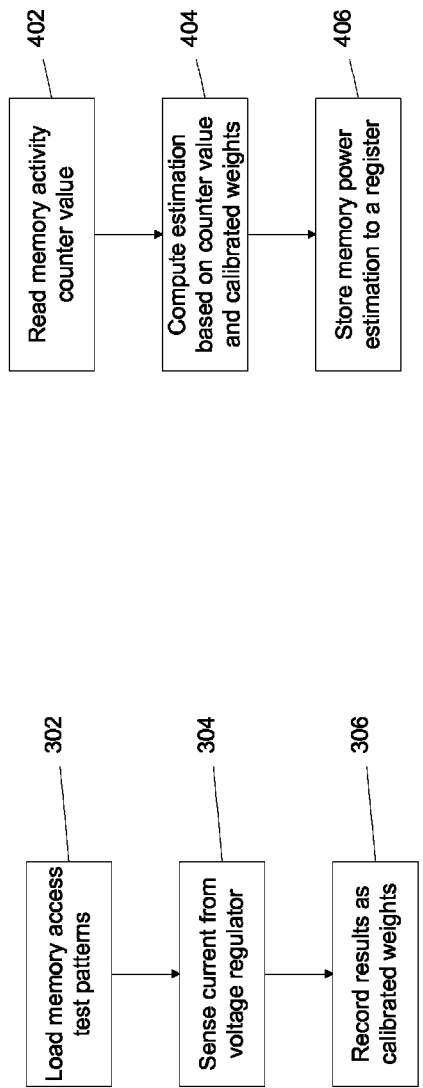

MEMORY POWER ESTIMATION BY MEANS OF CALIBRATED WEIGHTS AND ACTIVITY COUNTERS

BACKGROUND

Obtaining accurate real-time memory power information from the platform is very costly and requires voltage regulators (VR's) that can provide accurate current information across the loadline. Most VR's can provide high accuracy at the high end of the loadline, but provide poor accuracy at the low end of the loadline. Most server workloads exercising the memory at the low end of their power consumption, and thus the lower portion of the loadline, are of particular importance to memory power management.

BRIEF DESCRIPTION OF THE DRAWINGS

FIG. 3 is a flow chart of an example method for creating calibrated weights in accordance with an embodiment of the present invention.

FIG. 4 is a flow chart of an example method for estimating memory power in accordance with an embodiment of the present invention.

DETAILED DESCRIPTION

In various embodiments, memory power usage may be estimated in real time through the use of calibrated weights and activity counters. In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
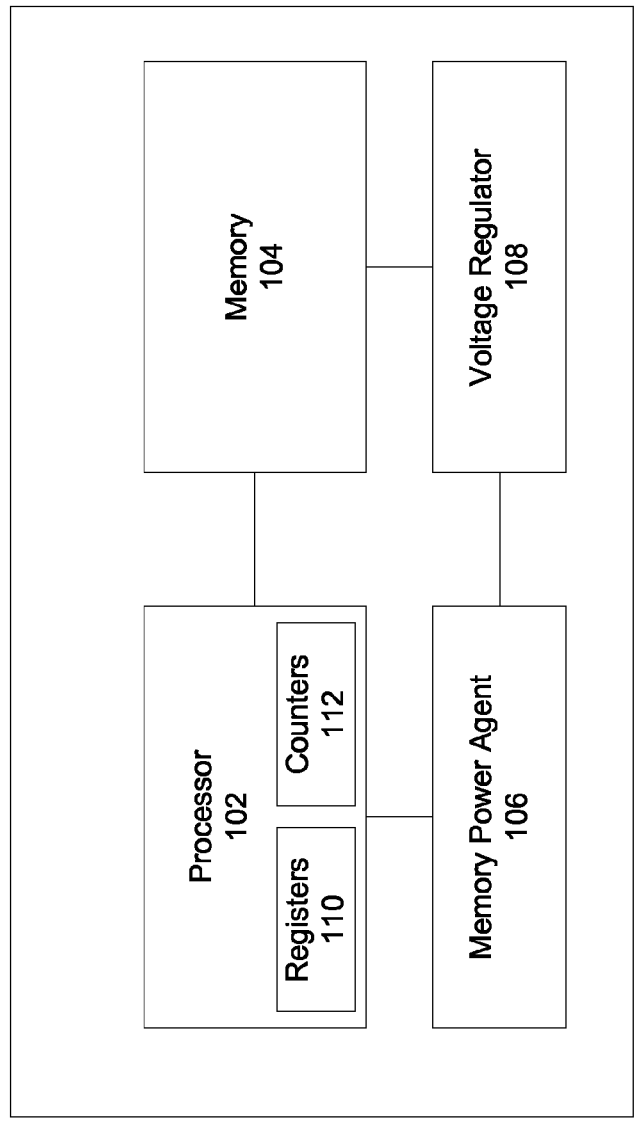
FIG. 1 is a block diagram of an example system including a memory power agent in accordance with one embodiment of the present invention.

Referring now to FIG. 1, shown is a block diagram of an example system including a memory power agent in accordance with one embodiment of the present invention. As shown in FIG. 1, system 100 may include processor 102, memory 104, memory power agent 106, and voltage regulator 108. Processor 102 may include registers 110 and counters 112, for storing memory power estimations and counting memory activities, respectively, as described in more detail hereinafter. Processor 102 is meant to represent any type of processor and may include any number of cores. Memory 104 is meant to represent any type of memory and while typically containing dynamic random access memory (DRAM), static random access memory (SRAM) or read only memory (ROM) may also be used.

Memory power agent 106 may be able to create calibrated memory power weights using test patterns, as described in more detail hereinafter. In one embodiment, during the execution of test patterns, memory power agent 106 receives a current measurement from voltage regulator 108, which supplies power to memory 104. The current measurement may be correlated with the test pattern being executed to form a calibrated memory power weight for a particular workload.

Memory power agent 106 may be able to utilize the calibrated weights created to provide real-time memory power usage estimates, as described in more detail hereinafter. In one embodiment, memory power agent 106 reads a value from memory activity counter 112 and, using the previously generated calibrated weights, computes a memory power usage estimate, which is stored in registers 110. Memory activity counters 112 may include various values corresponding to various portions of memory and may count memory activities such as active memory reads, active memory writes, enable activates, clock enable percentage and self-refresh percentage, for example.

Figure 2:
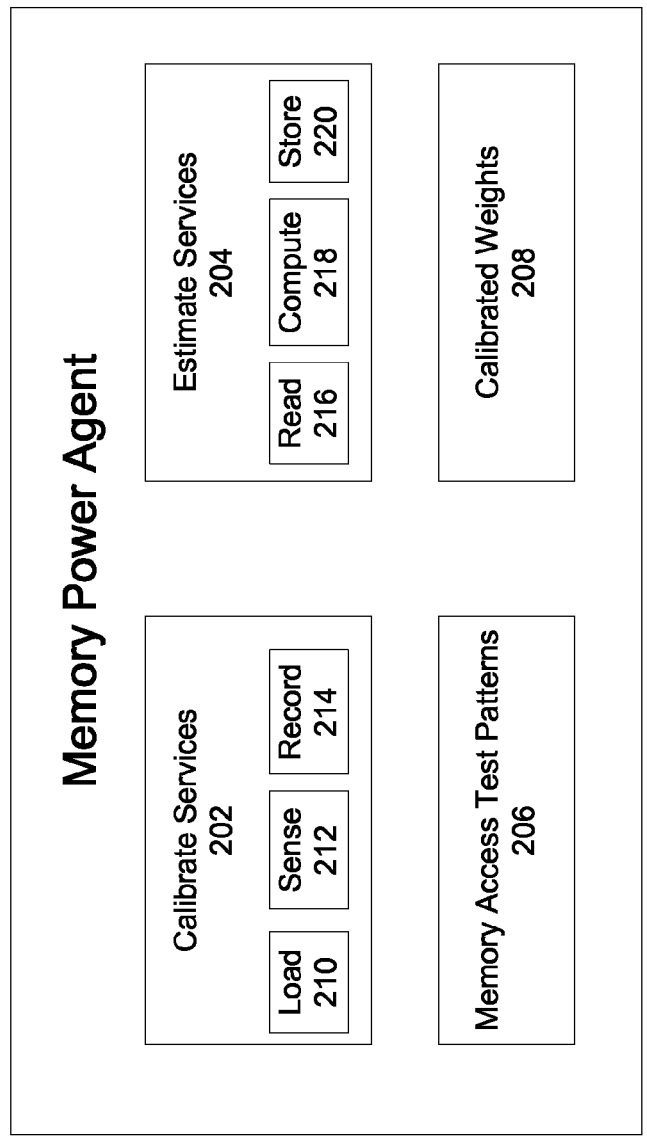
FIG. 2 is a block diagram of an example memory power agent in accordance with an embodiment of the present invention.

Referring now to FIG. 2, shown is a block diagram of an example memory power agent in accordance with an embodiment of the present invention. As shown in FIG. 2, memory power agent 106 may include calibrate services 202, estimate services 204, memory access test patterns 206 and calibrated weights 208.

Calibrate services 202 may provide memory power agent 106 with the ability to calibrate memory power usage for various levels of loading. Memory power agent 106 may invoke calibrate services 202 during every system, after a hardware configuration has changed or at some other time. Calibrate services 202 may selectively invoke load services 210, sense services 212 or record services 214 to load memory access test patterns 206 into processor 102, to receive current measurements from voltage regulator 108 and to record calibrated results 208, respectively. While shown as containing several functional blocks, calibrate services 202 may be implemented with fewer or with more elements. Also, calibrate services 202 may be implemented in hardware, software or a combination of hardware and software.

Estimate services 204 may provide memory power agent 106 with the ability to provide real-time memory power usage estimates. Memory power agent 106 may invoke estimate services 204 periodically, irregularly or at some other time(s). Estimate services 204 may selectively invoke read services 216, compute services 218 or store services 220 to read a value from memory activity counters 112, to determine a memory power estimation based at least in part on the value and calibrated weights 208 and to store the estimation into registers 110, respectively. While shown as containing several functional blocks, estimate services 204 may be implemented with fewer or with more elements. Also, estimate services 204 may be implemented in hardware, software or a combination of hardware and software.

Memory access test patterns 206 may be chosen to provide a wide range of memory activity levels during the calibration process so that calibrated weights 208 may specific characteristics of voltage regulator 108.

Referring now to FIG. 3, shown is a flow chart for generating calibrated weights in accordance with an embodiment of the present invention. As shown in FIG. 3, the method begins with load services 210 loading (302) access test patterns 206. In one embodiment, load services 210 is invoked during every system boot. In another embodiment, load services 210 is invoked if a system configuration has changed. The method continues with sense services 212 sensing (304) current from voltage regulator 108. In one embodiment, memory access test patterns involve varying activity levels and sense services 212 notes the associated changes in current. The method concludes with record services 214 recording (306) the results as calibrated weights 208.

Referring now to FIG. 4, shown is a flow chart of an example method for estimating memory power in accordance with an embodiment of the present invention. As shown in FIG. 4, the method begins with read services 216 reading memory activity counter 112 (402). In one embodiment, memory activity counter 112 contains a value or values for active memory reads and writes. The method continues with compute services 218 computing (404) an estimation for memory power usage based on calibrated weights and counters 112 values. In one embodiment, a plurality of counters 112 values are multiplied by an associated weight and aggregated to determine an estimated real-time memory power usage. In one embodiment, a current activity level is compared to activity levels during the calibration process to determine an estimated real-time memory power usage. The method concludes with store services 220 storing (406) the memory power estimation to registers 110. In one embodiment, registers 110 is globally available. One skilled in the art would appreciate that the memory power estimation in registers 110 may be useful for a power managing program, for example a running average power limit (RAPL) algorithm.

Figure 5:
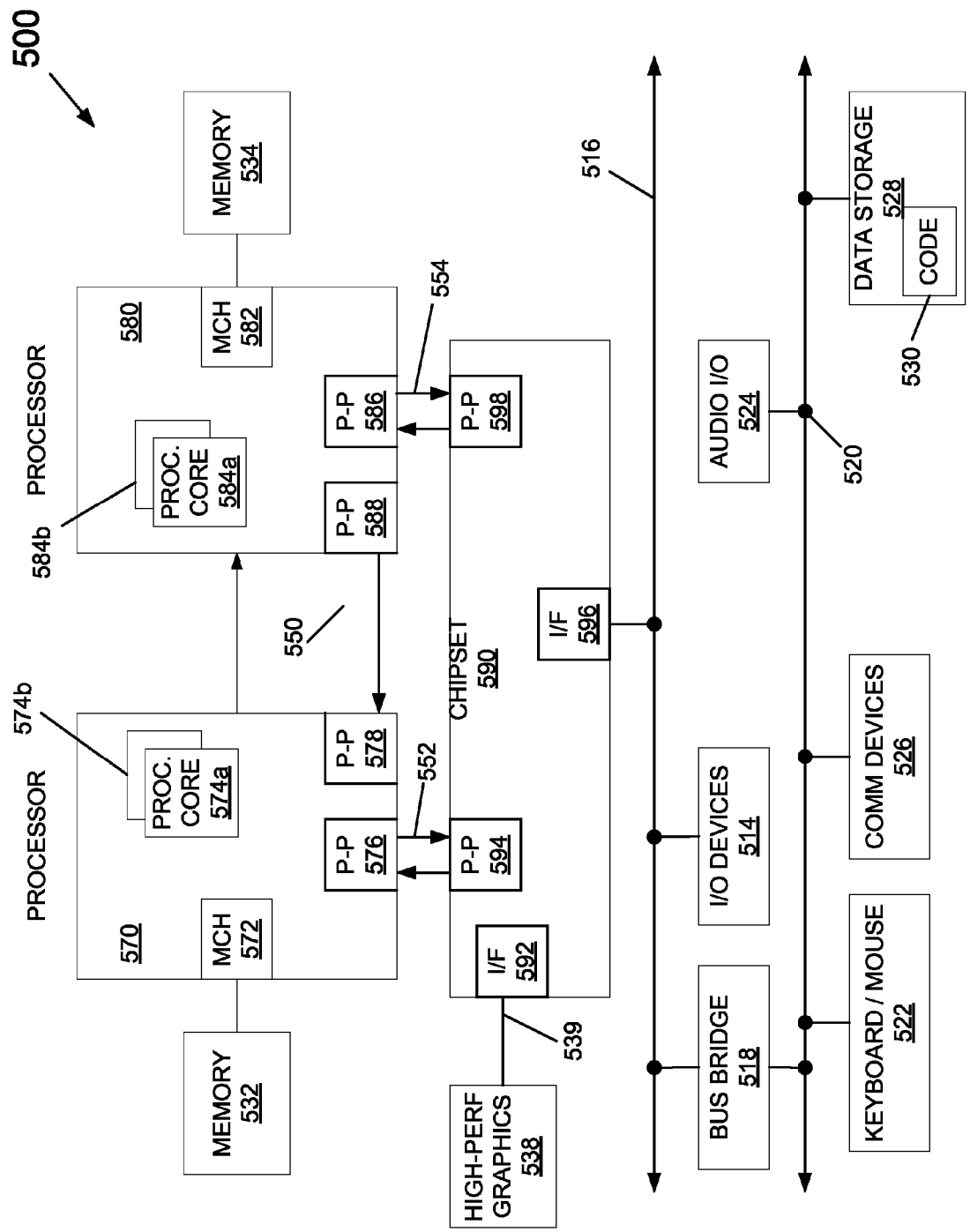
FIG. 5 is a block diagram of an example system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Each processor may include registers and memory activity counters in accordance with an embodiment of the present invention.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A storage medium comprising content which, when executed by an accessing machine, causes the accessing machine to:
   read a value from a memory activity counter;
   determine a memory power estimation based at least in part on the value and a calibration;
   store the memory power estimation to a register; and
   determine the calibration based on an execution of a memory access test pattern comprising receiving a current measurement from a voltage regulator across various memory loadings to determine specific characteristics of the voltage regulator.

2. The storage medium of claim 1, wherein the content to read a value from a memory activity counter comprises content to read a counter containing a value chosen from the group consisting of: active memory reads, active memory writes, enable activates, clock enable percentage, and self-refresh percentage.

3. The storage medium of claim 1, further comprising content which, when executed by an accessing machine, causes the accessing machine to read a plurality of values from a plurality of memory activity counters and determine the memory power estimation based at least in part on the plurality of values and a set of calibrations.

4. A system comprising:
   a processor including a memory controller and a memory activity counter;
   a dynamic random access memory (DRAM) coupled to the processor; and
   a memory power agent, the memory power agent to read a value from the memory activity counter, the memory power agent to determine a memory power estimation based at least in part on the value and a calibration, and the memory power agent to store the memory power estimation to a register, the memory power agent to determine the calibration based on an execution of a memory access test pattern, the memory power agent to receive a plurality of current measurements from a voltage regulator across various memory loadings to determine specific characteristics of the voltage regulator.

5. The system of claim 4, wherein the memory power agent to read a value from a memory activity counter comprises the memory power agent to read a counter containing a value chosen from the group consisting of: active memory reads, active memory writes, enable activates, clock enable percentage, and self-refresh percentage.

6. The system of claim 4, further comprising the memory power agent to read a plurality of values from a plurality of memory activity counters and determine the memory power estimation based at least in part on the plurality of values and a set of calibrations.

7. A method for estimating a memory power consumption in a computing system comprising:
- determining a calibration based on an execution of a memory access test pattern;
- reading a value from a memory activity counter; computing a memory power estimation based at least in part on the value and a calibration; and
- storing the memory power estimation to a register;
- wherein determining the calibration based on the execution of a memory access test pattern comprises receiving a current measurement from a voltage regulator, wherein receiving a current measurement from a voltage regulator comprises receiving a plurality of current measurements from a voltage regulator across various memory loadings to determine specific characteristics of the voltage regulator.

8. The method of claim 7, wherein determining the calibration based on the execution of a memory access test pattern comprises executing the memory access test pattern during a system boot.

9. The method of claim 7, wherein reading a value from a memory activity counter comprises reading a counter containing a value chosen from the group consisting of: active memory reads, active memory writes, enable activates, clock enable percentage, and self-refresh percentage.

10. The method of claim 7, further comprising reading a plurality of values from a plurality of memory activity counters and computing the memory power estimation based at least in part on the plurality of values and a set of calibrations.

\* \* \* \* \*